United States Patent [19]
Petry

[11] 4,081,157
[45] Mar. 28, 1978

[54] AIRCRAFT CONVEYOR LOAD REDISTRIBUTION SYSTEM

[75] Inventor: Gene A. Petry, Conover, Ohio

[73] Assignee: The United States of America as represented by the Secretary of the Air Force, Washington, D.C.

[21] Appl. No.: 786,691

[22] Filed: Apr. 11, 1977

Related U.S. Application Data

[63] Continuation of Ser. No. 679,410, Apr. 22, 1976, abandoned.

[51] Int. Cl.² ............................................. B64C 1/22
[52] U.S. Cl. ................................. 244/137 R; 193/35 B
[58] Field of Search ........................ 244/118 R, 137 R; 214/84; 193/35 R, 35 B, 35 F, 35 SS

[56] References Cited

U.S. PATENT DOCUMENTS

| 2,077,188 | 4/1937 | Rishel | 193/35 B |
| 2,216,504 | 10/1940 | Sekulski | 193/35 B |
| 3,612,316 | 10/1971 | Baldwin et al. | 244/137 R |

Primary Examiner—Trygve M. Blix
Assistant Examiner—Charles E. Frankfort
Attorney, Agent, or Firm—Joseph E. Rusz; Richard J. Killoren

[57] ABSTRACT

A cargo aircraft conveyor system having palletized loads supported on a plurality of rows of roller conveyors positioned in spaced relation across the aircraft floor, with the roller conveyors being supported on bulkheads. The conveyor system includes load limitors to deform at a predetermined load or hinged spring loaded roller sets supported between pairs of bulkheads to redistribute the load and to transmit a more uniform load to the rollers and to the bulkheads.

2 Claims, 4 Drawing Figures

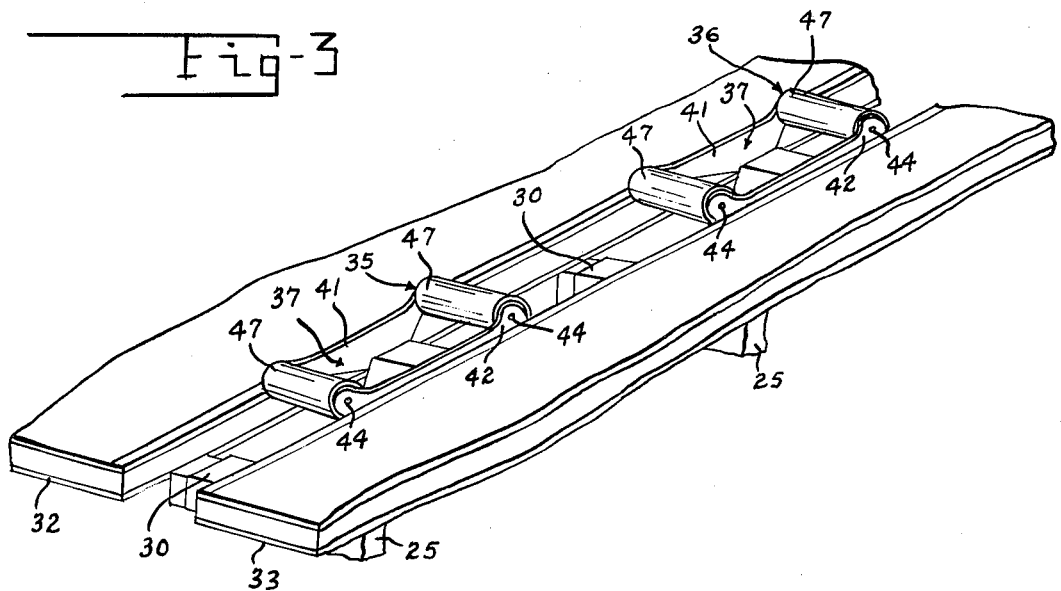
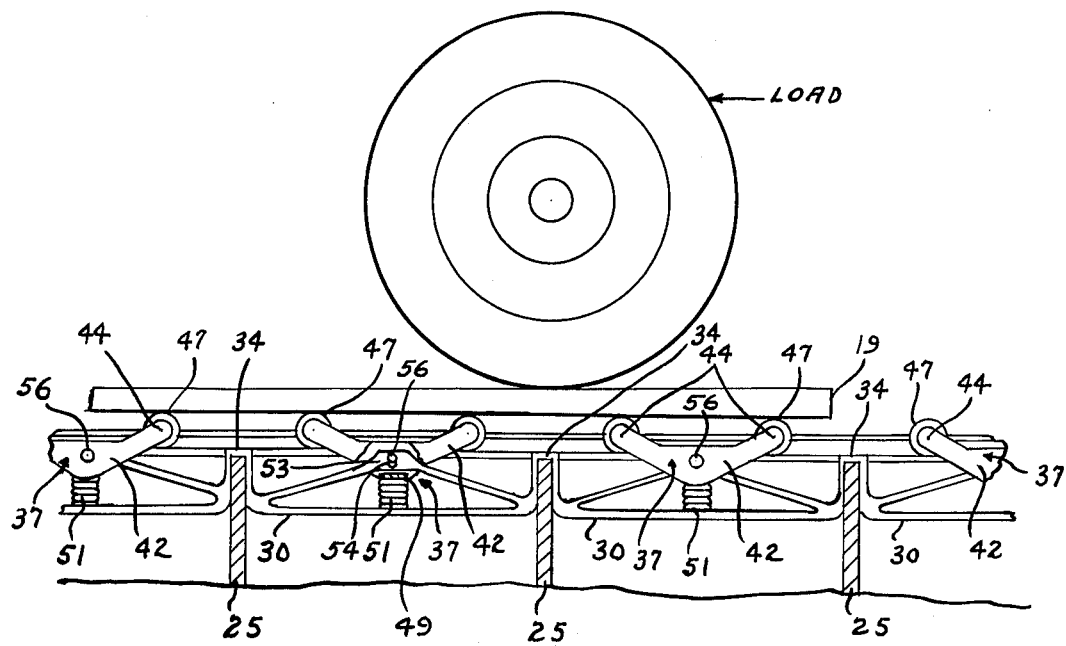

AIRCRAFT CONVEYOR LOAD REDISTRIBUTION SYSTEM

RIGHTS OF THE GOVERNMENT

This invention described herein may be manufactured and used by or for the Government of the United States for all governmental purposes without the payment of any royalty.

CROSS REFERENCE TO RELATED APPLICATIONS

This is a continuation of my copending application, Aircraft Conveyor Load Redistribution System, Serial No. 679,410, filed April 22, 1976 and now abandoned.

BACKGROUND OF THE INVENTION

This invention relates to a cargo conveyor system for air drop or transport aircraft. Operational cargo aircraft have rail conveyor systems that employ rollers spaced in equal increments on a roller tray with four conveyors placed on the cargo floor. This type of design allows lateral rows of rollers adjacent to a bulkhead to transmit very high loads to the bulkhead. These loads in many cases would exceed the structural design limitations of the rollers and the bulkheads. Restrictions must therefore be placed on aircraft use.

The palletized drop loads with conventional rigging use honeycomb load limiters to protect the load, such as tracks, tanks and road graders, from high impact G-loads up to 19.5 G's. The aircraft conveyor and conveyor support system are designed to withstand loads no greater than 4.5 G. The palletized loads, rigged for high G impact loads, do not transmit uniform loads to conveyors and bulkheads. In fact, many rollers carry little or no load while other rollers have loads which exceed their allowable limits.

BRIEF SUMMARY OF THE INVENTION

According to this invention, systems are provided to redistribute the load on a cargo aircraft conveyor system. According to one embodiment of the invention, low G load limiters are provided between the load and the pallet. The load limiters will pass only allowable loads to a given lateral row of rollers. The load limiters deform at a given load so as to deform the load to other load limiters so that adjacent rollers will be forced to accept loads up to their respective limits.

Permanently deformable load limiters, such as honeycomb stacks, can be used to redistribute the load for some applications. Non-permanently deformable load limiters may be more desirable for certain applications.

According to another embodiment of the invention, roller sets are supported between pairs of bulkheads. The roller sets are hinged and spring loaded so that the roller sets can deflect under excessive loads. When the roller sets tilt or deflect, the load is shifted to other rollers or roller sets to provide more uniform loading of the rollers from the palletized load.

IN THE DRAWINGS

FIG. 3 is a schematic isometric view of one of the roller conveyors of FIG. 1 modified according to another embodiment of the invention.

FIG. 4 is a schematic partially cut away side view of the roller conveyor of FIG. 3 with a palletized load.

DETAILED DESCRIPTION OF THE INVENTION

Figure 1:
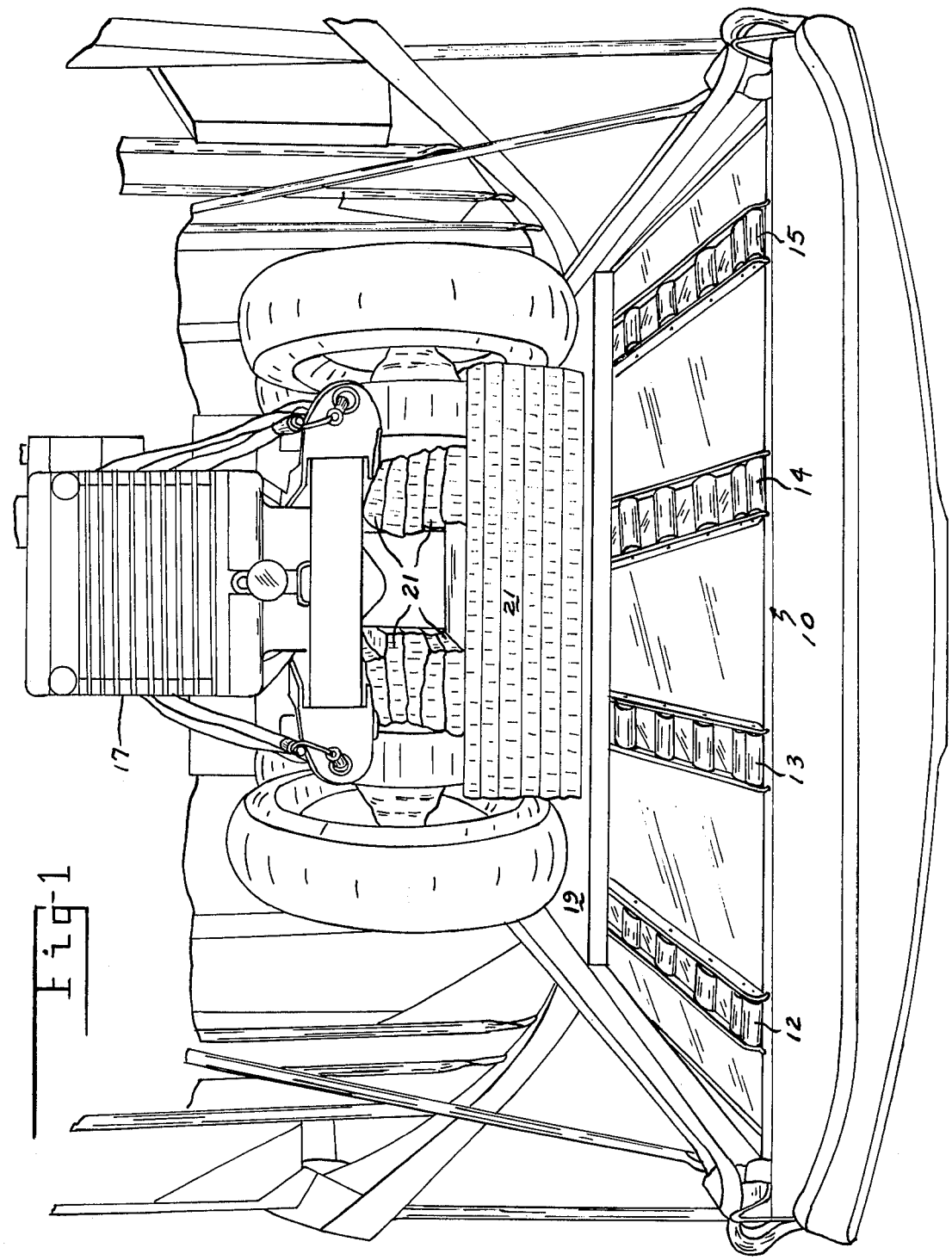
FIG. 1 is a schematic isometric view of a conventional cargo aircraft conveyor system with palletized load.

Reference is now made to FIG. 1 of the drawing which shows a conventional cargo aircraft loading and unloading system 10 having four roller type conveyors 12, 13, 14 and 15. Cargo loads, such as road grader 17, are secured to pallet 19 with conventional rigging. Since the grader must withstand high G-loads in air drops, paper honeycomb load limiter material 21 is provided to protect the grader against impact loads up to 19.5 G. The conventional rigging for nonuniform loads does not transmit uniform loads to the roller 23 and to the bulkheads 25, shown in FIG. 2.

Figure 2:
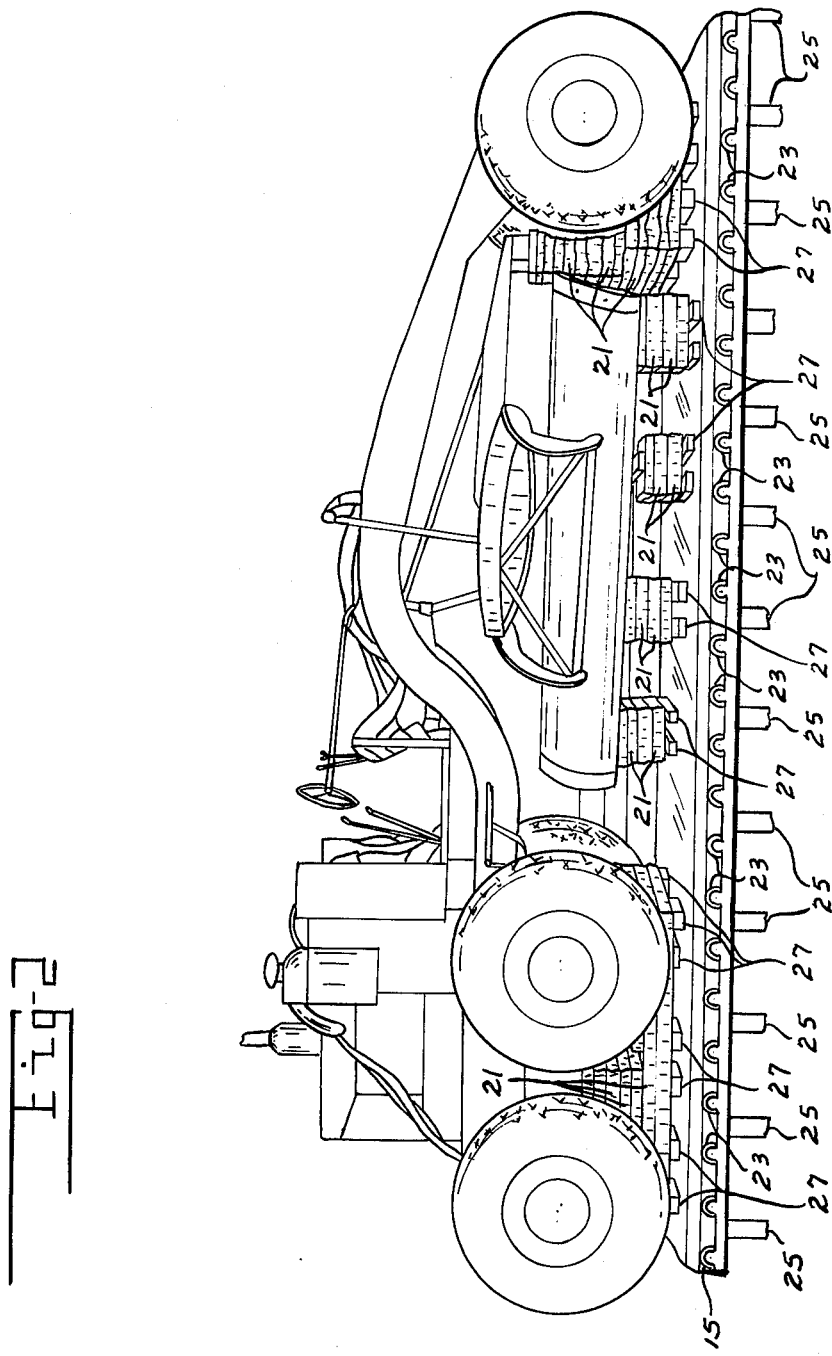
FIG. 2 is a partially schematic side view of the device of FIG. 1 modified according to one embodiment of the invention.

According to this invention, the rigging is modified as shown in FIG. 2. Additional load limiters 27 of the same material as load limiter 21 are positioned between the road grader 17 and the pallet 19. By making these of much smaller area so that they will deform at much lower G-loads than the load limiters 21, the load will be redistributed to other portions of the pallet which will also redistribute the load on the rollers and the bulkheads.

Aircraft cargo loading structure will normally not withstand loads greater than 4.5 G. Since some margin is required, the load limiters are dimensioned to deform at a G-load less than 4.5 G, such as approximately three G's. The paper honeycomb material normally used for load limiters 21 will start to crush at 6000 lbs/sq ft. For the particular aircraft conveyor system shown, the limit load on the rollers is approximately 1550 lbs per roller. Thus, to find the area of the load limiters 27, divide 1550 by 6000 so that each of the load limiters will have an area of 1550/6000 or approximately ¼ sq ft. For other roller limits or other load limiter material, such a Styrofoam, the area of the load limiters 27 would be calculated in a similar manner.

For the purpose of this application low G load limiters will be considered to be those which deform at less than 4.5 G's and high G load limiters will be considered to be those which will deform only at loads above 4.5 G's.

The load limiters 27 are located in lateral rows which are substantially equally longitudinally beneath the load limiters 21.

In the operation of the device when the aircraft is in flight and flight conditions are such that the G-load on any of the low-G load limiters exceeds three G's, the load limiters will deform so that part of the load is shifted to the adjacent low G load limiters. This will act to redistribute the load on the rollers and bulkheads. When the cargo is air dropped, all of the load limiters 27 will be crushed on impact and the load limiters 21 will then act to protect the cargo load in the normal manner.

The honeycomb material described above for load limiters 27 would be permanently deformable. For some applications, resilient load limiters, pneumatic load limiters, hydraulic load limiters or other deformable apparatus may be desired. Also non-deformable load limiters can be used which will deform load limiters 21 in the area of load limiters 27 to provide a like result.

With the load distribution system described above, no change is required in the aircraft structure but special rigging is required for each load. Load redistribution can also be accomplished in the manner shown in FIGS. 3 and 4.

In this apparatus, conveyor support frames 30 are supported on the bulkheads 25 between floor sections 32 and 33. The frames 30 include elements 34 which hook over and engage the bulkheads 25. Roller sets, two of which are shown at 35 and 36 in FIG. 3, are supported on the conveyor support frames 30. The roller sets have roller support frames 37 pivotably supported on the conveyor support frame 30 as shown in FIG. 4. The roller support frames have two roller suppport brackets 41 and 42 with shafts 44 passing through brackets 41 and 42 and rollers 47. A spring support plate 49, one of which is shown, is welded, or secured in some other manner, to each set of brackets 41 and 42. Springs 51 are positioned between plates 49 and the conveyor support frame 30. Retainers, not shown, secure the springs to the plates 49 and conveyor support frame 30. The conveyor support frame also has members 53, one of which is shown, with guide slots 54, for receiving the shafts 56 secured to brackets 41 and 42. This permits the roller support frames 37 to pivot in members 53 of the conveyor support frame 30, to shift load from one roller to the other of a roller set and the springs 51 permit one roller set to shift load to another roller set.

While springs have been shown to permit compression of the roller sets, other means such as pneumatic or hydraulic means could be used. The pneumatic or hydraulic apparatus for the roller sets could be interconnected to more uniformly distribute the load. The slots 54 will limit the travel of unloaded roller sets. If desired, separate stop means could be provided, where needed, to limit travel of the roller sets.

There is thus provided apparatus for redistributing load in a cargo aircraft conveyor system.

I claim:
1. In a cargo aircraft having a plurality of bulkheads supporting the cargo floor of the aircraft; conveyor apparatus within said aircraft for loading and unloading nonuniformly loaded palletized loads on said aircraft; said conveyor apparatus having a plurality of rollers; apparatus for redistributing the nonuniform palletized loads on said conveyor apparatus and said bulkheads comprising: a plurality of conveyor support frames supported on said bulkheads; a plurality of roller support frames pivotably supported on said conveyor support frames; said roller support frames being supported on said conveyor support frames approximately midway between pairs of bulkheads; means connected between the conveyor support frames and the roller support frames for transferring excessive loads on certain of said rollers to adjacent rollers; said conveyor support frames including means, hooking over said bulkheads, for engaging the bulkheads.

2. The device as recited in claim 1 wherein said roller support frames are pivotably supported on said conveyor support frames by means of shafts passing through the roller support frames and the conveyor support frames; each of said roller support frames forming the support for a pair of rollers with one roller of each pair being positioned on one side of the shaft for the corresponding roller support frame and the other roller of each pair being positioned on the other side of the shaft; said conveyors being positioned in a direction transverse to said bulkheads with one roller support frame for each conveyor being positioned between each adjacent pair of bulkheads, throughout the length of the conveyors; said means for transferring excessive loads on certain of said rollers to adjacent rollers including at least one spring member between each roller support frame and the corresponding conveyor support frame.

* * * * *

UNITED STATES PATENT AND TRADEMARK OFFICE
CERTIFICATE OF CORRECTION

PATENT NO. : 4,081,157
DATED : March 28, 1978
INVENTOR(S) : Gene A. Petry

It is certified that error appears in the above-identified patent and that said Letters Patent are hereby corrected as shown below:

Column 2, line 49, insert --- spaced --- after "equally".

Signed and Sealed this

Eighth Day of August 1978

[SEAL]

Attest:

RUTH C. MASON
Attesting Officer

DONALD W. BANNER
Commissioner of Patents and Trademarks